C. P. BOSSERT.
COOPERING.
APPLICATION FILED AUG. 10, 1912.
1,055,986. Patented Mar. 11, 1913.
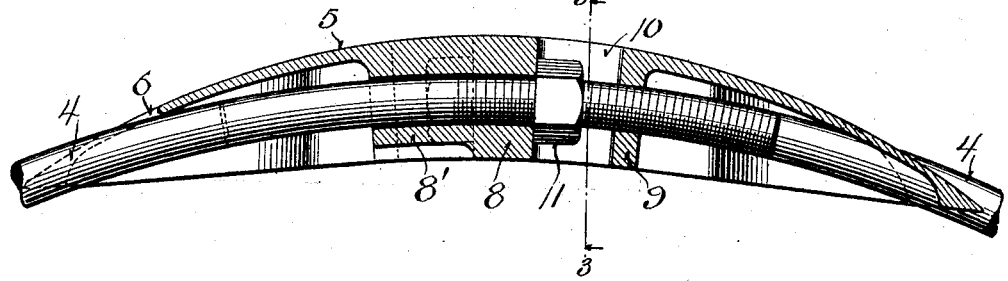
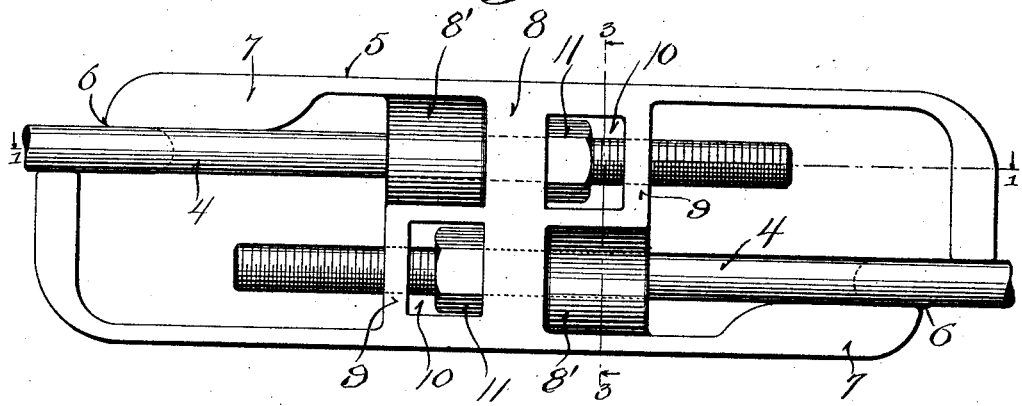
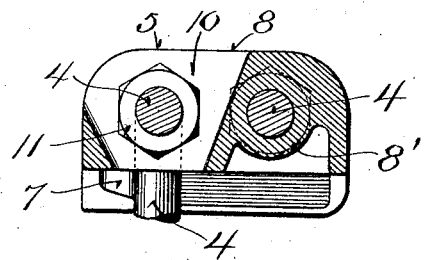
Witnesses:
Inventor:
Charles P. Bossert

UNITED STATES PATENT OFFICE.

CHARLES P. BOSSERT, OF MILWAUKEE, WISCONSIN.

COOPERING.

1,055,986.   Specification of Letters Patent.   Patented Mar. 11, 1913.

Application filed August 10, 1912. Serial No. 714,334.

*To all whom it may concern:*

Be it known that I, CHARLES P. BOSSERT, a citizen of the United States, and resident of Milwaukee, in the county of Milwaukee and State of Wisconsin, have invented certain new and useful Improvements in Coopering; and I do hereby declare that the following is a full, clear, and exact description thereof.

My invention consists in what is herein particularly set forth with reference to the accompanying drawings and pointed out in the claims of this specification, its object being to provide simple, economical and efficient means for connecting the ends of hoops and tightening said hoops on cooperage of various kinds, especially revolving drums, tanks and the like employed in tanneries or elsewhere.

A further object of the invention is to avoid dangerous exposure of hoop-ends, nuts or other parts.

Figure 1 of the drawings represents a circumferential sectional view of a hoop-end connecting and tightening means in accordance with my invention, the view being indicated by line 1—1 in the next figure of the series; Fig. 2, a rear elevation of what is shown in Fig. 1, and Fig. 3, a cross-section view indicated by line 3—3 in Fig. 2.

Referring by numerals to the drawings 4 indicates a rod-hoop having screw-threaded ends, and 5 a lug with which said ends are connected. In practice, the lug is a curvilinear casting, for the most part hollow, its inner bearing surface being shaped to conform to the contour of coopered drums, tanks and the like. Outwardly the arc of the lug is of less radius than the inner bearing surface, there being a convergence of both arcs at the ends of said lug. The lug is provided at each end with a longitudinal corner recess 6 to engage upon the hoop 4, said recesses being diagonally opposite. Thickened portions 7 of the lug constitute the outer walls of the recesses therein, as is best shown in Fig. 2, for the purpose hereinafter specified. Midway of its ends, the lug is provided with a bridge 8 having projections 8' that extend therefrom in opposite directions at right angles thereto, and in line with each of said projections between the bridge and a transverse web 9 is a space 10 preferably in the form of an aperture, the inner wall of each space being preferably beveled. The lug-bridge and its projections 8', as well as the webs 9, are twin-bored for the passage of screw-threaded ends of the hoop 4, and nuts 11 are arranged in the lug-spaces 10 on said hoop. The nuts are turned against opposite sides of the lug-bridge to tighten the hoop, sufficient wrench clearance being had in the spaces aforesaid.

By having the lug thickened, parallel to the plane of the ends of the hoop engaging the recesses aforesaid, said lug is not liable to fracture under skewing-strain when one or the other of the nuts is turned to tighten said hoop, it being obvious that the hoop-ends pass one another in the aforesaid lug.

The general construction and contour of the lug and its application to the hoop in conjunction with the nuts is such that the hoop-ends and said nuts are not exposed outside of said lug, which same is exteriorly smooth. Hence there is no danger of persons being caught and injured, as would otherwise be the case.

I claim:

1. A hoop-end connecting and tightening means comprising a curvilinear partly hollow and exteriorly smooth lug having longitudinal hoop-recesses at diagonally opposite corners thereof, an inner twin-bore bridge intermediate of its ends and outwardly open spaces each in line with a bridge-bore; together with nuts in said spaces for engagement with hoop-ends extended through the bridge-bores.

2. A hoop-end connecting and tightening means comprising a curvilinear partly hollow and exteriorly smooth lug having longitudinal hoop-recesses at diagonally opposite corners thereof, an inner central bridge provided with bored projections extending at right-angles thereto in opposite directions, and a bored web in line with each bridge-projection; together with nuts in outwardly open spaces provided in the lug between the bridge and webs thereof, the nuts being for engagement of hoop-ends that extend through said bridge-projections and webs.

3. A hoop-end connecting and tightening means comprising a curvilinear partly hollow and exteriorly smooth lug having longitudinal hoop-recesses at diagonally opposite corners thereof, the outer wall of each recess being a thickened portion of the lug, an inner twin-bore bridge intermediate of its ends and outwardly open spaces each in line with a bridge-bore; together with nuts in said spaces for engagement with hoop-ends extended through the bridge-bores.

4. A curvilinear partly hollow and exteriorly smooth lug having longitudinal recesses at diagonal corners thereof, an inner twin-bore bridge intermediate of its ends and outwardly open spaces each alined with a bridge-bore; in combination with a rod-hoop engaging the lug-recesses to extend at its ends through the bridge-bores, and bridge-opposing nuts on the hoop in the lug-spaces aforesaid.

In testimony that I claim the foregoing I have hereunto set my hand at Milwaukee in the county of Milwaukee and State of Wisconsin in the presence of two witnesses.

CHARLES P. BOSSERT.

Witnesses:
N. E. OLIPHANT,
M. E. DOWNEY.

Copies of this patent may be obtained for five cents each, by addressing the "Commissioner of Patents, Washington, D. C."